(12) United States Patent
Nishimura (10) Patent No.: US 10,049,164 B2
(45) Date of Patent: Aug. 14, 2018

(54) MULTIDIMENSIONAL-RANGE SEARCH APPARATUS AND MULTIDIMENSIONAL-RANGE SEARCH METHOD

(71) Applicant: NEC Corporation, Tokyo (JP)

(72) Inventor: Shoji Nishimura, Tokyo (JP)

(73) Assignee: NEC Corporation, Tokyo (JP)

(*) Notice: Subject to any disclaimer, the term of this patent is extended or adjusted under 35 U.S.C. 154(b) by 278 days.

(21) Appl. No.: 14/903,006

(22) PCT Filed: Jun. 2, 2014

(86) PCT No.: PCT/JP2014/064589
§ 371 (c)(1),
(2) Date: Jan. 5, 2016

(87) PCT Pub. No.: WO2015/005017
PCT Pub. Date: Jan. 15, 2015

(65) Prior Publication Data
US 2016/0154890 A1    Jun. 2, 2016

(30) Foreign Application Priority Data
Jul. 12, 2013  (JP) .................. 2013-146654

(51) Int. Cl.
*G06F 17/30* (2006.01)
(52) U.S. Cl.
CPC .. *G06F 17/30867* (2013.01); *G06F 17/30333* (2013.01); *G06F 17/30592* (2013.01)
(58) Field of Classification Search
CPC ......... G06F 17/30867; G06F 17/30333; G06F 17/30592

(Continued)

(56) References Cited

U.S. PATENT DOCUMENTS 6,633,883 B2 * 10/2003 Koskas ............. G06F 17/30595
6,687,688 B1 *  2/2004 Fujihara ........... G06F 17/30327
(Continued)

FOREIGN PATENT DOCUMENTS

JP    2010-160591 A    7/2010

OTHER PUBLICATIONS

International Search Report, corresponding to PCT/JP2014/064589, dated Jul. 8, 2014, 2 pages.
(Continued)

*Primary Examiner* — Jean M Corrielus
(74) *Attorney, Agent, or Firm* — Wilmer Cutler Pickering Hale and Dorr LLP (57) ABSTRACT

Provided is a multidimensional-range search apparatus (10) including: an acquisition unit (11) that acquires a target index key indicating arbitrary point on a space-filling curve; an extraction unit (12) that extracts prefix data capable of indicating a bit string of an index key included in an unsearched section on the space-filling curve on the basis of a bit string of the target index key; a determination unit (13) that determines overlapping of an inquiry section of a multidimensional-range search and a prefix section on the space-filling curve which is indicated by the prefix data; a specification unit (14) that specifies, as a search point, an index key indicating a minimum point or a maximum point in an overlap section in which the inquiry section overlaps the prefix section, which is closest to the target index key on the space-filling curve, and which is determined to overlap the inquiry section by the determination unit; and a search unit (15) that searches an index storage unit (16) for page information corresponding to the index key specified as the search point.

11 Claims, 9 Drawing Sheets

(58) Field of Classification Search
USPC .......................................................... 707/770
See application file for complete search history.

(56) References Cited

U.S. PATENT DOCUMENTS

| | | | |
|---|---|---|---|
| 9,619,501 B2* | 4/2017 | Nishimura | G06F 17/30333 |
| 2002/0091704 A1* | 7/2002 | Bayer | G06F 17/30327 |
| 2002/0095421 A1* | 7/2002 | Koskas | G06F 17/30595 |
| 2008/0086464 A1* | 4/2008 | Enga | G06F 17/30241 |
| 2013/0212107 A1* | 8/2013 | Uchida | G06F 17/30327 |
| | | | 707/739 |
| 2015/0012544 A1* | 1/2015 | Nishimura | G06F 17/30333 |
| | | | 707/743 |
| 2015/0356128 A1* | 12/2015 | Nishimura | G06F 17/30324 |
| | | | 707/745 |

OTHER PUBLICATIONS

Mizue et al., "Prototyping and evaluation of P2P grid platform with resource management mechanism," The Institute of Electronics, Information and Communication Engineers Dai 18 Kai Proceedings of Data Engineering Workshop, Jun. 1, 2007, 9 pages.

Nishimura et al., "Ippanka sareta Z-Order o Mochiita Tajigen Sakuin no Teian," Dai 5 Kai Forum on Data Engineering and Information Management (Dai 11 Kai the Database Society of Japan Nenji Taikai) May 31, 2013, 10 pages.

Nishimura et al., "MD-HBase: A Scalable Multi-Dimensional Data Infrastructure for Location Aware Services," IEEEE Computer Society, Jun. 6, 2011, 10 pages.

* cited by examiner

| | 000 | 001 | 010 | 011 | 100 | 101 | 110 | 111 |
|---|---|---|---|---|---|---|---|---|
| 111 | 010 101 | 010 111 | 011 101 | 011 111 | 110 101 | 110 111 | 111 101 | 111 111 |
| 110 | 010 100 | 010 110 | 011 100 | 011 110 | 110 100 | 110 110 | 111 100 | 111 110 |
| 101 | 010 001 | 010 011 | 011 001 | 011 011 | 110 001 | 110 011 | 111 001 | 111 011 |
| 100 | 010 000 | 010 010 | 011 000 | 011 010 | 110 000 | 110 010 | 111 000 | 111 010 |
| 011 | 000 101 | 000 111 | 001 101 | 001 111 | 100 101 | 100 111 | 101 101 | 101 111 |
| 010 | 000 100 | 000 110 | 001 100 | 001 110 | 100 100 | 100 110 | 101 100 | 101 110 |
| 001 | 000 001 | 000 011 | 001 001 | 001 011 | 100 001 | 100 011 | 101 001 | 101 011 |
| 000 | 000 000 | 000 010 | 001 000 | 001 010 | 100 000 | 100 010 | 101 000 | 101 010 |

FIG. 8

| INDEX DATA | PAGE INFORMATION |
|---|---|
| 0000** | 0x0001 |
| 0001** | 0x005b |
| 001*** | 0x008e |
| 010000 | 0x0103 |
| 010001 | 0x0114 |
| 010010 | 0x012a |
| ⋮ | ⋮ |
| 011100 | 0x0??? |
| 011101 | 0x0??? |
| 011110 | 0x0??? |
| 011111 | 0x0??? |
| 10**** | 0x06a8 |
| 11**** | 0x0??? |

FIG. 9

| | 000 | 001 | 010 | 011 | 100 | 101 | 110 | 111 |
|---|---|---|---|---|---|---|---|---|
| 111 | 010 / 101 | 010 / 111 | 011 / 101 | 011 / 111 | 110 / 101 | 110 / 111 | 111 / 101 | 111 / 111 |
| 110 | 010 / 100 | 010 / 110 | 011 / 100 | 011 / 110 | 110 / 100 | 110 / 110 | 111 / 100 | 111 / 110 |
| 101 | 010 / 001 | 010 / 011 | 011 / 001 | 011 / 011 | 110 / 001 | 110 / 011 | 111 / 001 | 111 / 011 |
| 100 | 010 / 000 | 010 / 010 | 011 / 000 | 011 / 010 | 110 / 000 | 110 / 010 | 111 / 000 | 111 / 010 |
| 011 | 000 / 101 | 000 / 111 | 001 / 101 | 001 / 111 | 100 / 101 | 100 / 111 | 101 / 101 | 101 / 111 |
| 010 | 000 / 100 | 000 / 110 | 001 / 100 | 001 / 110 | 100 / 100 | 100 / 110 | 101 / 100 | 101 / 110 |
| 001 | 000 / 001 | 000 / 011 | 001 / 001 | 001 / 011 | 100 / 001 | 100 / 011 | 101 / 001 | 101 / 011 |
| 000 | 000 / 000 | 000 / 010 | 001 / 000 | 001 / 010 | 100 / 000 | 100 / 010 | 101 / 000 | 101 / 010 |

MULTIDIMENSIONAL-RANGE SEARCH APPARATUS AND MULTIDIMENSIONAL-RANGE SEARCH METHOD

CROSS-REFERENCE TO RELATED APPLICATIONS

The present application is a national stage application of International Application No. PCT/JP2014/064589 entitled "Multidimensional-Range Search Apparatus and Multidimensional-range search method," filed on Jun. 2, 2014, which claims the benefit of priority from Japanese Patent Application No. JP2013-146654, filed on Jul. 12, 2013, the disclosures of which are incorporated herein in their entirety by reference thereto.

TECHNICAL FIELD

The present invention relates to an index scanning technique in a multidimensional-range search.

BACKGROUND ART

Scalable distributed databases have been proposed along with an increase in the number of pieces of data. Most of the scalable databases realize scalability by supporting only a simple inquiry process such as only a one-dimensional range search. On the other hand, scalable databases enabling a multidimensional-range search by mapping a multidimensional value to a one-dimensional value have also been proposed (Non-Patent Document 1 mentioned below). In Non-Patent Document 1 mentioned below, a multidimensional-range search for one-dimensional data is generally realized as follows.

There exists an indexing unit and a data storage unit. A data set is divided into pages so as to be set to be equal to or less than a certain number of threshold values, and is stored in the data storage unit. At this time, the data set is spatially divided by a space-based space division method so that the number of pieces of data included in each partial space becomes equal to or less than a threshold value, and the divided data sets are distributed to pages associated with the respective partial spaces.

Figure 7:
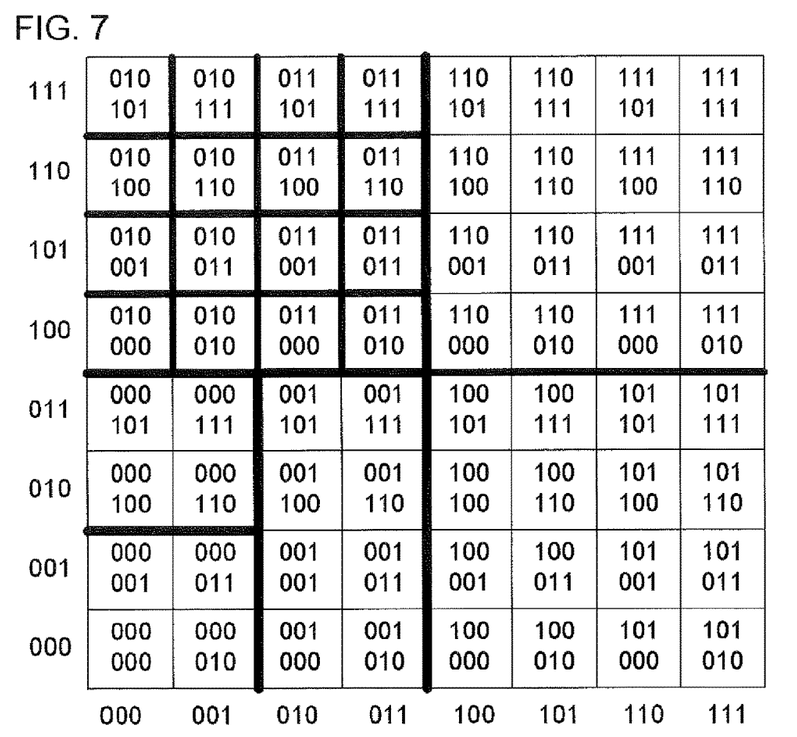
FIG. 7 is a diagram illustrating an example of space division of a two-dimensional space which is mapped to a data set.
Figure 8:
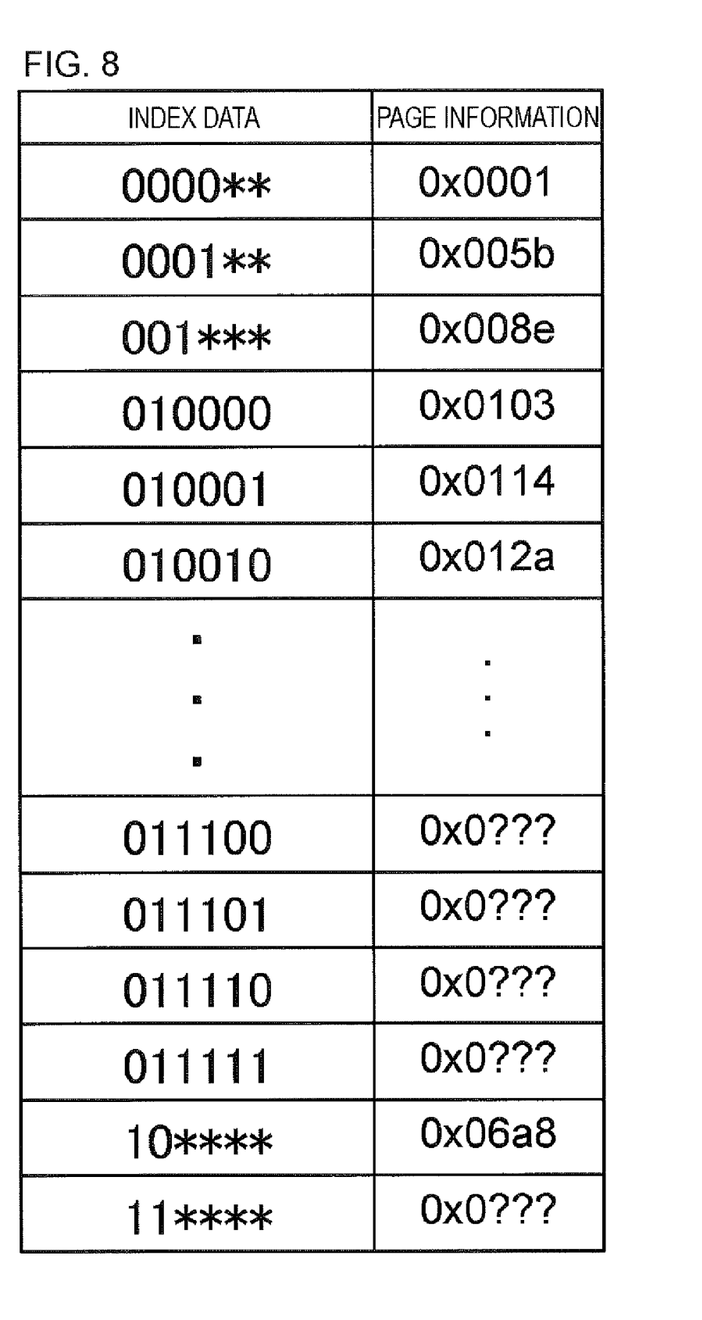
FIG. 8 is a diagram illustrating an index generated from the example of FIG. 7.

FIG. 7 is a diagram illustrating an example of the space division of a two-dimensional space mapped to a data set. In FIG. 7, the two-dimensional space is represented in a one-dimensional manner using a space-filling curve called Z-curve, and a one-dimensional key value is represented by binary numbers. In the indexing unit, each partial space is given a name on the basis of the longest common prefix of a bit string of a key value included in each partial space, and a sequence of the partial spaces sorted by names is an index. FIG. 8 is a diagram illustrating an index generated from the example of FIG. 7.

Figure 9:
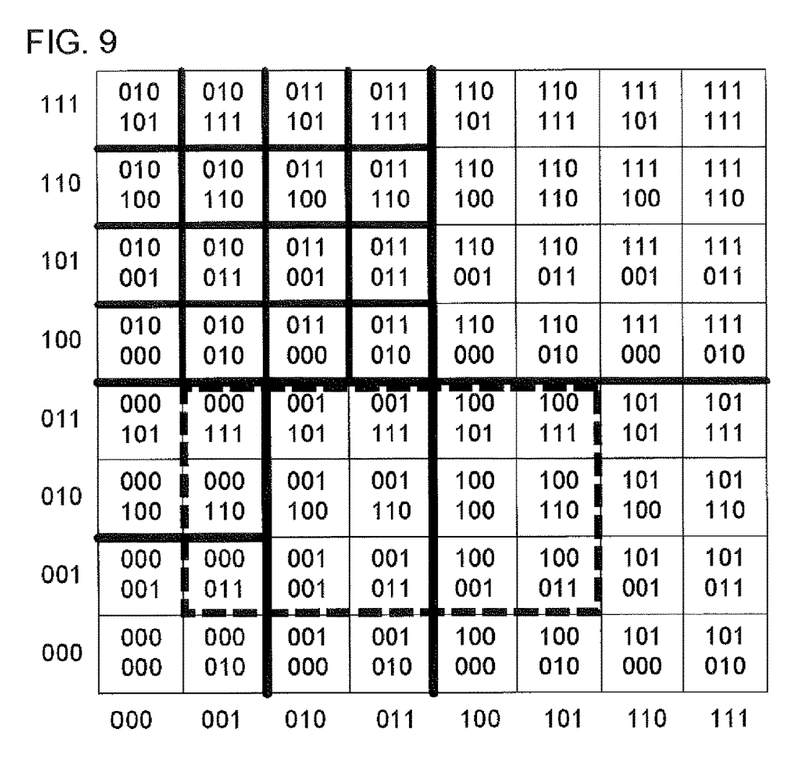
FIG. 9 is a diagram illustrating an example of a search range in the example of FIG. 7.

In Non-Patent Document 1 mentioned below, the multidimensional-range search is realized by operating the indexing unit as follows. Among sections obtained by representing a search target range (search space) in a one-dimensional manner, a bit string indicating a maximum value (referred to as a maximum point) and a bit string indicating a minimum value (referred to as a minimum point) are acquired. At this time, suppose that the search space is a region indicated by a dotted line in FIG. 9. In this case, a minimum point is a position "000011" at the lower left corner in the region, and a maximum point is a position "100111" at the upper right corner in the region. Subsequently, in the method, a range from the minimum point to the maximum point is scanned on the index. At this time, it is checked whether or not at least a portion of each of the partial spaces within the scanning range overlaps a range to be searched for, and a data page associated with the overlapping partial space is determined to be an object to be searched for. According to the example of FIG. 9, a range from a space name "0000\*\*" to a space name "10\*\*\*\*" is checked. That is, in this example, the overlapping of the search space and each of partial spaces corresponding to substantially all entries on the index is checked. However, the partial spaces overlapping the search space are only four partial spaces of "0000\*\*", "0001\*\*", "001\*\*\*", and "10\*\*\*\*". As a result of the checking, a plurality of partial spaces of "010000" to "011111" does not overlap the search space and are excluded from objects to be searched for.

RELATED DOCUMENT

Patent Document

[Non-Patent Document 1] Shoji Nishimura, Sudipto Das, Divyakant Agrawal, Amr El Abbadi, "MD-HBase: A Scalable Multi-Dimensional Data Infrastructure for Location Aware Services", IEEE Computer Society, 2011.6.6.

SUMMARY OF THE INVENTION

However, in the above-mentioned method, index scanning may be inefficient in a multidimensional-range search. For example, although a search space is smaller than the entire multidimensional space as illustrated in the above-mentioned example of FIG. 9, a large number of partial spaces may be included in the scanning range of the index (from the minimum point to the maximum point). In the above-mentioned method, it is checked whether each of all of the partial spaces between the minimum point and the maximum point in the index scanning range overlaps the search space, and thus it may take a long time to extract a partial space overlapping the search space by index scanning.

Such a problem is caused by distortion, which occurs when a multidimensional space is represented in a one-dimensional manner. For example, when values of some of a plurality of attributes are not designated as a search range and all value ranges of some attributes are designated, there is the possibility of all indexes being scanned in spite of the designated ranges of some attributes being sufficiently narrowed down. Such a problem becomes prominent in a case where the number of dimensions to be searched is large, a case where the widths of ranges of respective dimensions to be designated during a search are different from each other, or the like.

The present invention is contrived in view of such situations, and an object thereof is to provide a technique for speeding up the detection of a hit page during a multidimensional-range search.

In aspects of the present invention, the following configurations are adopted in order to solve the above-mentioned problem.

A first aspect relates to a multidimensional-range search apparatus. The multidimensional-range search apparatus according to the first aspect includes: an acquisition unit acquiring a target index key indicating an arbitrary point on a space-filling curve used to represent a multidimensional space, a data set being mapped to the multidimensional space in a one-dimensional manner, the data set being constituted by a plurality of attributes; an extraction unit extracting prefix data capable of indicating a bit string of an index key included in an unsearched section on the space-filling curve, on the basis of a bit string of the target index key acquired by the acquisition unit; a determination unit determining overlapping of an inquiry section of a multidimensional-range search and a prefix section on the space-filling curve, the prefix section being formed by a set of index keys having in common a prefix of the prefix data extracted by the extraction unit; a specification unit specifying, as a search point, an index key indicating a minimum point or a maximum point in an overlap section in which the inquiry section overlaps the prefix section, the prefix section being closest to the target index key on the space-filling curve and being determined to overlap the inquiry section by the determination unit; and a search unit searching an index storage unit for page information corresponding to the index key specified as the search point by the specification unit. The space-filling curve used in the first aspect has characteristics in which the prefix data and the prefix section are associated with each other on a one-to-one basis, the prefix section being formed by a set of index keys having in common a prefix of the prefix data in common, and in which a length of the prefix of the prefix data and a size of the prefix section have a negative correlation.

A second aspect relates to a multidimensional-range search method that uses a space-filling curve having the same characteristics as those of the first aspect. The multidimensional-range search method according to the second aspect includes: acquiring a target index key indicating an arbitrary point on a space-filling curve used to represent a multidimensional space, a data set being mapped to the multidimensional space in a one-dimensional manner, the data set being constituted by a plurality of attributes; extracting prefix data capable of indicating a bit string of an index key included in an unsearched section on the space-filling curve, on the basis of a bit string of the target index key; determining overlapping of an inquiry section of a multidimensional-range search and a prefix section on the space-filling curve, the prefix section being formed by a set of index keys having in common a prefix of the extracted prefix data; specifying, as a search point, an index key indicating a minimum point or a maximum point in an overlap section in which the inquiry section overlaps the prefix section, the prefix section being closest to the target index key on the space-filling curve and being determined to overlap the inquiry section; and searching an index storage unit for page information corresponding to the index key specified as the search point.

Note that, another aspect of the present invention may relate to a program causing at least one computer to execute the method of the second aspect or may relate to a computer-readable recording medium having the program recorded thereon. The recording medium includes a non-transitory type medium.

According the above-described aspects, it is possible to provide a technique for speeding up the detection of a hit page during a multidimensional-range search.

BRIEF DESCRIPTION OF THE DRAWINGS

The above-described objects, other objects, features and advantages will become further apparent from the preferred exemplary embodiments described below, and the accompanying drawings as follows.

DESCRIPTION OF EXEMPLARY EMBODIMENTS

Hereinafter, an exemplary embodiment of the present invention will be described. Meanwhile, the exemplary embodiments described below are merely illustrative of the invention, and the present invention is not limited to the configurations of the following exemplary embodiments.

A multidimensional-range search apparatus to be described below in an exemplary embodiment of the present invention acquires a query for a multidimensional-range search and extracts information regarding a data page (hit page) that covers an inquiry section (search space) of the query. Here, the wording "multidimensional-range search" as used herein refers to a range search in which a plurality of attributes are designated in conditions, and the number of attributes designated is not particularly limited as long as the number is two or more. According to the page information extracted by the multidimensional-range search apparatus, it is possible to specify a place where data included in the inquiry section is stored.

[Apparatus Configuration]

Figure 1:
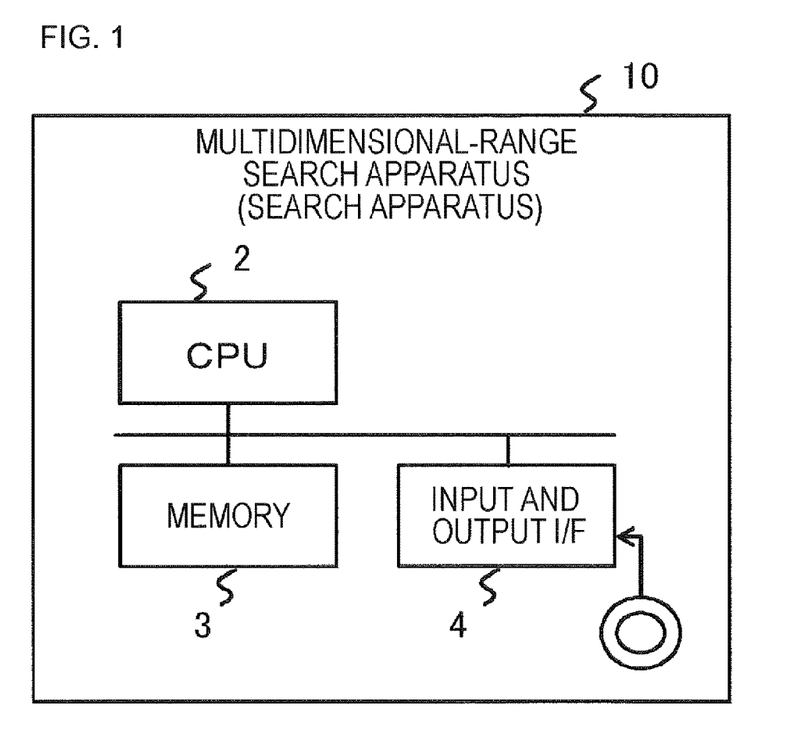
FIG. 1 is a schematic diagram illustrating a hardware configuration example of a multidimensional-range search apparatus (search apparatus) according to an exemplary embodiment of the present invention.

FIG. 1 is a schematic diagram illustrating a hardware configuration example of a multidimensional-range search apparatus (hereinafter, simply referred to as a search apparatus) 10 in the exemplary embodiment of the present invention. The search apparatus 10 according to the present exemplary embodiment is a so-called computer, and includes a central processing unit (CPU) 2, a memory 3, and input and output interface (I/F) 4, and the like which are connected to each other through, for example, a bus 5. The memory 3 is a random access memory (RAM), a read only memory (ROM), a hard disk, or the like.

The input and output I/F 4 can be connected to a communication device performing communication with another computer through a network (not shown), a device for controlling access to a portable storage medium, an input device that receives an input of a user's operation like a keyboard, a mouse, or the like, an output device such as a display device or a printer which provides information to a user, and the like. However, a hardware configuration of the search apparatus 10 is not limited.

[Processing Configuration]

Figure 2:
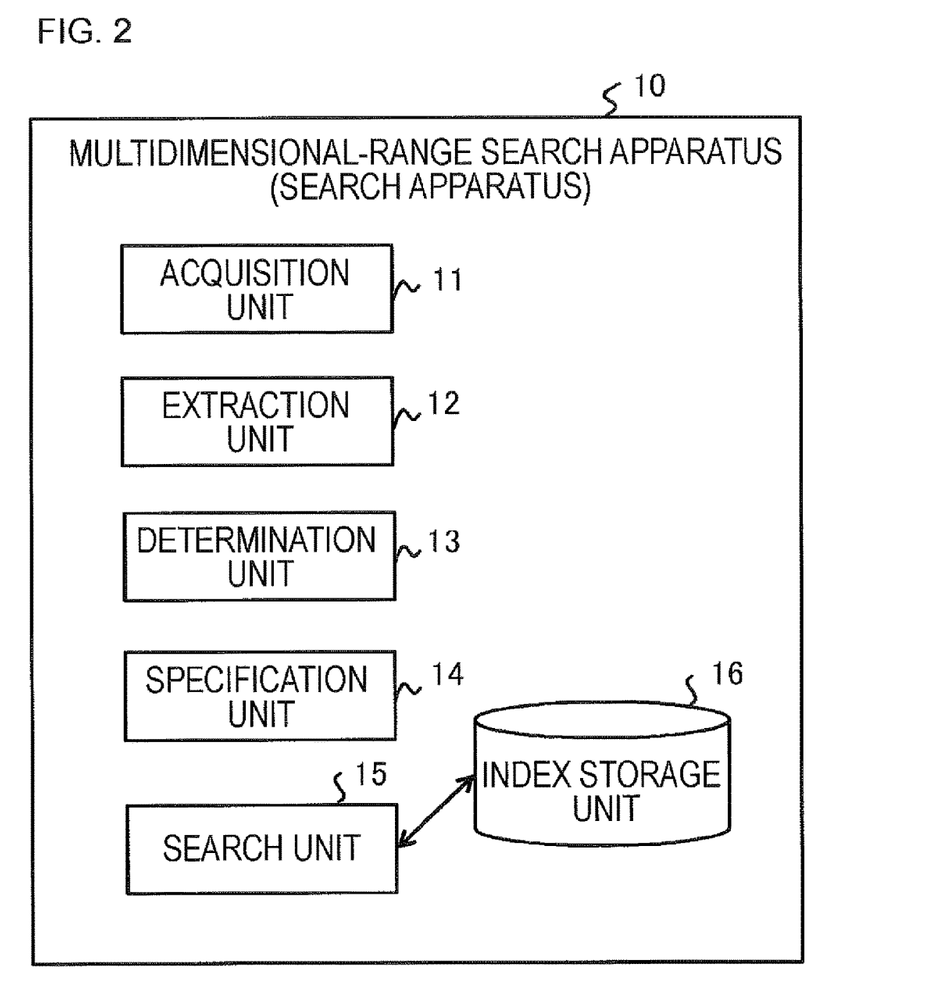
FIG. 2 is a schematic diagram illustrating a processing configuration example of a multidimensional-range search apparatus (search apparatus) according to a first exemplary embodiment.

FIG. 2 is a schematic diagram illustrating a processing configuration example of a search apparatus 10 according to a first exemplary embodiment. The search apparatus 10 according to the first exemplary embodiment includes an acquisition unit 11, an extraction unit 12, a determination unit 13, a specification unit 14, a search unit 15, an index storage unit 16, and the like. These processing units are realized by executing a program stored in the memory 3, for example, by the CPU 2. In addition, the program may be installed through the input and output I/F 4 from a portable storage medium, such as a compact disc (CD) or a memory card, or another computer on a network, and may be stored in the memory 3.

The index storage unit 16 stores a plurality of entries each of which includes index data and page information. A data set, which includes a plurality of attributes and is a target of searching for by the search apparatus 10, is spatially divided with a space-based space division method so that the number of pieces of data included in each partial space become equal to or less than a threshold value, and the divided data sets are distributed to data pages associated with the respective partial spaces. On the other hand, each data point in a multidimensional space to which the data set is mapped is indexed by each multidimensional index key (hereinafter, simply referred to as an index key), which is generated by the multidimensional space being represented by space-filling curve in a one-dimensional manner.

The index data stored in the index storage unit 16 has a data format capable of specifying the position and range of a certain partial space in the multidimensional space, and is formed by a combination of the longest common prefix of an index key included in the corresponding partial space and wildcard characters. In addition, when the number of index keys included in the corresponding partial space is one, index data indicating the partial space is the index key itself. Page information stored in the index storage unit 16 indicates the location of a data page associated with a partial space indicated by index data included in the same entry as the page information. The data page itself may be stored in the search apparatus 10 or may be stored in another apparatus.

The entries stored in the index storage unit 16 are sorted by name of the index data. That is, in the index storage unit 16, pieces of page information are sorted by name of the index data. In addition, the index storage unit 16 may store the entries in a well-known tree structure such as a B-tree. In the example of FIG. 2, the search apparatus 10 includes the index storage unit 16, but the index storage unit 16 may be implemented on another apparatus.

In the present exemplary embodiment, a well-known fixed curve, such as a Z-curve or a Hilbert curve, may be used as a space-filling curve for representing the multidimensional space in a one-dimensional manner, or a more generalized curve may be used. The generalized space-filling curve represents a multidimensional space in a one-dimensional manner by, for example, mixing bit strings of respective attributes in arbitrary order without changing an arrangement order of the bit strings of the respective attributes. The space-filling curve used in the present exemplary embodiment may have characteristics in which prefix data and a prefix section, formed by a set of index keys having a prefix of the prefix data in common, are associated with each other on a one-to-one basis, and may have characteristics in which the length of the prefix of the prefix data and the size of the prefix section have a negative correlation. The prefix data will be described later.

The acquisition unit 11 acquires a target index key indicating an arbitrary point on the space-filling curve used to represent the multidimensional space in a one-dimensional manner. For example, the arbitrary point can be set as a final point (minimum point or maximum point) of a searched section on the space-filling curve. The acquisition unit 11 may acquire the target index key through the input and output I/F 4 from a portable storage medium, another computer, or the like, or may acquire the target index key as information which is input by a user operating an input unit on the basis of an input screen or the like. A method of acquiring the target index key is not limited.

The extraction unit 12 extracts prefix data capable of representing a bit string of an index key included in an unsearched section on the space-filling curve, on the basis of a bit string of the target index key acquired by the acquisition unit 11. Here, the wording "unsearched section" as used herein refers to a section on a space-filling curve constituted by index keys to be scanned along the space-filling curve subsequently to the scanning of a target index key.

The wording "prefix data" as used herein refers to a bit string having a fixed bit length, and is a bit string constituted by only a prefix or a bit string constituted by a prefix and at least one wildcard character. Here, one wildcard character is also treated as 1-bit data. When index keys of "011001" to "111111" are included in the unsearched section, for example, the extraction unit 12 extracts "011001", "01101*", "0111", and "1***" as pieces of prefix data. In this example, "*" is used for the wildcard character. However, the wildcard character is not limited. These pieces of prefix data can represent all of the index keys included in the unsearched section ("011001" to "111111").

In this manner, prefix data extracted by the extraction unit 12 corresponds to one partial space indicating at least one index key within a multidimensional space to which a data set is mapped. In the present exemplary embodiment, a space-filling curve is used in which the prefix data corresponds to a prefix section formed by a set of index keys having a prefix of the prefix data in common (partial space) on a one-to-one basis and in which the length of the prefix of the prefix data and the size of the prefix section have a negative correlation. Here, the wording "negative correlation" between the length of the prefix of the prefix data and the size of the prefix section refers to a correlation in which the prefix section corresponding to the prefix data becomes smaller as the length of the prefix becomes longer and the prefix section corresponding to the prefix data becomes larger as the length of the prefix becomes shorter.

The extraction unit 12 can extract prefix data from a bit string of a target index key, for example, in the following manner. The extraction unit 12 has a replacement rule including at least one of bit inversion and replacement with a wildcard character, for each of capable bit patterns with a predetermined bit length that does not depend on the number of attributes of a data set, and extracts prefix data using a replacement rule corresponding to a bit pattern of partial bit strings obtained by partitioning a bit string of a target index key by the predetermined bit length.

The replacement rule of the extraction unit 12 is set to be adaptable to the space-filling curve and the predetermined bit length, which are used in the present exemplary embodiment. Here, the predetermined bit length is not particularly limited insofar as the length is equal to or greater than 1 bit. For example, the predetermined bit length can be set to a length capable of being efficiently processed by a computer (for example, 64 bits or 128 bits). In this manner, it is possible to improve the efficiency of a process of applying a replacement rule, and thereby making a process of extracting prefix data faster.

The determination unit 13 determines the overlapping of an inquiry section of a multidimensional-range search and a prefix section on a space-filling curve, the prefix section being formed by a set of index keys having in common a prefix of prefix data extracted by the extraction unit 12. Here, by using the prefix data, it is possible to easily acquire a maximum value and a minimum value of the prefix section. When all wildcard characters are replaced with 1, the maximum value of the prefix section may be acquired. When all wildcard characters are replaced with 0, the minimum value of the prefix section may be acquired. For example, the determination unit 13 may compare the maximum value and the minimum value in the prefix section with a maximum value and a minimum value in the inquiry section to thereby easily determine whether or not both of the sections overlap each other. Here, the overlapping of the prefix section and the inquiry section means at least partial overlapping of both the sections.

The specification unit 14 specifies, as a search point, an index key indicating a minimum point or a maximum point of an overlap section where an inquiry section overlaps a prefix section, the prefix section being closest to a target index key on a space-filling curve and being determined to overlap the inquiry section by the determination unit 13. The search point specified by the specification unit 14 indicates an index key which is included in the inquiry section of the multidimensional-range search, and which is to be scanned subsequently to the target index key acquired by the acquisition unit 11.

For example, the specification unit 14 can specify the search point as follows. When specifying as a search point the index key indicating the minimum point in the overlap section, the specification unit 14 compares, for each attribute, a bit string of each attribute (dimension) constituting an index key indicating a minimum point in a prefix section with a bit string of each attribute constituting the index key indicating the minimum point in the inquiry section to thereby specify an index key indicating a minimum point in the overlap section in descending order of bit string of each attribute. In addition, when specifying as a search point the index key indicating the maximum point in the overlap section, the specification unit 14 compares a bit string of each attribute (dimension) constituting an index key indicating a maximum point in the prefix section with a bit string of each attribute constituting an index key indicating a maximum point in the inquiry section to thereby specify an index key indicating a maximum point in the overlap section in ascending order of bit string of each attribute. In this manner, it is possible to easily extract the minimum value or the maximum value in the prefix section by using prefix data and to easily specify the minimum point or the maximum point in the overlap section where the prefix section and the inquiry section overlap each other. The specification unit 14 can specify the search point using another method.

The search unit 15 searches the index storage unit 16 for page information corresponding to the index key specified as a search point by the specification unit 14. Specifically, the search unit 15 specifies an entry including index data including the index key as a search point from the index storage unit 16 and extracts page information included in the specified entry.

[Operational Advantages]

Figure 3:
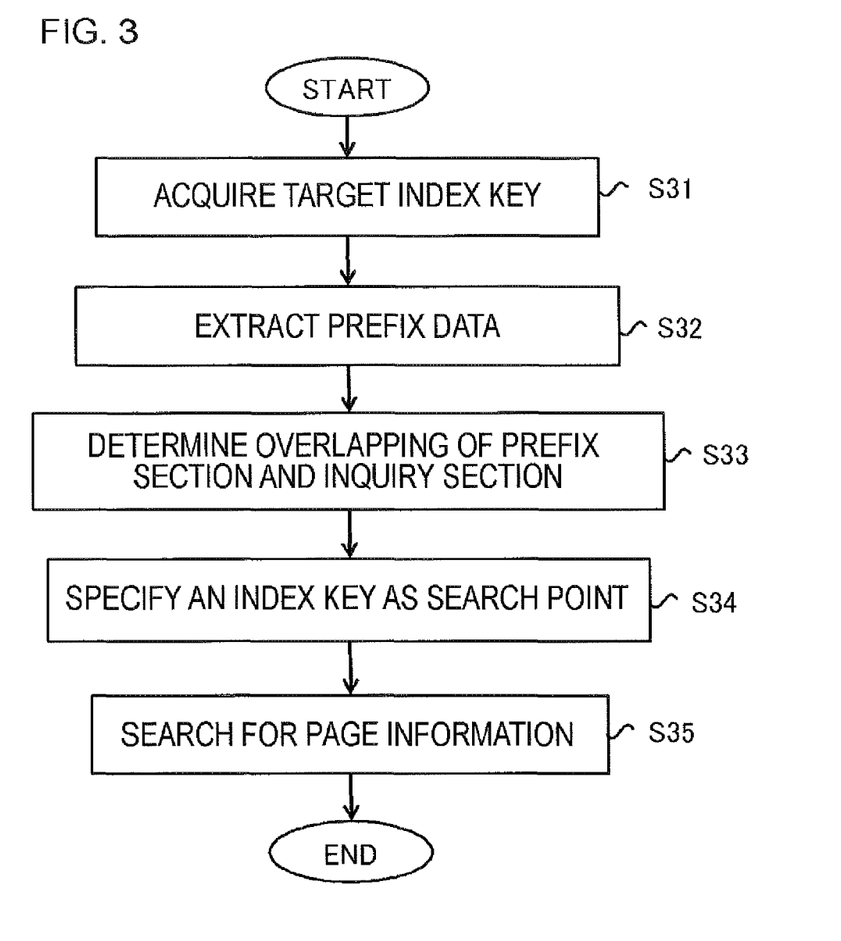
FIG. 3 is a flow chart illustrating an operational example of the multidimensional-range search apparatus (search apparatus) according to the above-described exemplary embodiment.

Hereinafter, a multidimensional-range search method according to an exemplary embodiment of the present invention will be described with reference to FIG. 3. FIG. 3 is a flow chart illustrating an operational example of the search apparatus 10 in the above-described exemplary embodiment. In the following description, the search apparatus 10 serves as a subject of execution of each process, but each of the above-mentioned processing units included in the search apparatus 10 or another apparatus may serve as a subject of execution.

Here, in the multidimensional-range search method according to the present exemplary embodiment, a data set constituted by a plurality of attributes is divided by a space-based space division method, and the divided data sets are distributed to a plurality of data pages, and it is assumed that the index storage unit 16 mentioned above is present. Here, the index storage unit 16 may be present on the search apparatus 10 or may be present on another apparatus.

First, the search apparatus 10 acquires a target index key indicating any point on a space-filling curve used to represent a multidimensional space, to which a data set constituted by a plurality of attributes is mapped, in a one-dimensional manner (S31).

The search apparatus 10 extracts prefix data capable of representing a bit string of an index key included in an unsearched section on the space-filling curve on the basis of a bit string of the target index key acquired in (S31) mentioned above (S32). The unsearched section and the prefix data are as mentioned above. In addition, a method of extracting the prefix data may be realized by the above-mentioned method as the process of the extraction unit 12.

Subsequently, the search apparatus 10 determines the overlapping of a prefix section on a space-filling curve, formed by a set of index keys having a prefix of the prefix data extracted in (S32) in common, and an inquiry section of a multidimensional-range search (S33).

The search apparatus 10 specifies, as a search point, an index key indicating a minimum point or a maximum point in an overlap section where an inquiry section overlaps a prefix section, which is closest to a target index key on a space-filling curve, and which is the prefix section determined to overlap the inquiry section in (S33) mentioned above (S34). The specification of the search point may be implemented by the above-mentioned method as the process of the specification unit 14.

The search apparatus 10 searches the index storage unit 16 for page information corresponding to the index key specified as a search point in (S34) (S35). The index key specified as a search point in (S34) is an index key to be scanned in the inquiry section subsequently to the target index key acquired in (S31), and the page information extracted in (S34) indicates a page to be hit in the inquiry section.

[Operational Advantages of the Present Exemplary Embodiment]

As described above, in the present exemplary embodiment, prefix data indicating an unsearched section on a space-filling curve is extracted on the basis of a bit string of a target index key indicating an arbitrary point on the space-filling curve, and the overlapping of a prefix section indicated by the prefix data and an inquiry section of a multidimensional-range search is determined. In addition, an index key indicating a minimum point or a maximum point in an overlap section where the inquiry section overlaps a prefix section closest to the target index key on the space-filling curve is specified as a search point, and page information corresponding to the index key indicating the search point is searched for.

In this manner, in the present exemplary embodiment, based on an arbitrary point on a space-filling curve, a search point within an inquiry section which is closest to the point on a space-filling curve is specified, and page information corresponding to the search point is searched for. Therefore, according to the present exemplary embodiment, the search point can be specified without checking whether or not each of all partial spaces located between a minimum point and a maximum point in the inquiry section overlaps the inquiry section, and thus it is possible to detect a hit page during a multidimensional-range search at a high speed.

In addition, a space-filling curve used in the present exemplary embodiment is not limited insofar as the space-filling curve has characteristics in which prefix data and a prefix section are associated with each other on a one-to-one basis, the prefix section being formed by a set of index keys having the prefix of the prefix data in common, and in which the length of the prefix of the prefix data and the size of the prefix section have a negative correlation. That is, a well-known space-filling curve fixed as a rule may be used, or a space-filling curve representing a multidimensional space in a one-dimensional manner by mixing bit strings of respective attributes in any order, without changing the arrangement order of the bit strings of the respective attributes, may be used.

Therefore, according to the present exemplary embodiment, when the space-filling curve having the above-mentioned characteristics can be used, it is possible to drastically relax the limitation of index design and the limitation of a page division method for a data set. That is, according to the present exemplary embodiment, it is possible to expand applicable index design and data page division.

Expansion Example

In the above-described exemplary embodiment, as described below, it is possible to more efficiently acquire a prefix section, closest to a target index key on a space-filling curve, which is a prefix section overlapping an inquiry section.

The extraction unit 12 sequentially extracts pieces of prefix data in order of proximity to the target index key on the space-filling curve by scanning a bit string of the target index key toward a high order from a low order. The determination unit 13 determines the overlapping of an inquiry section and a prefix section corresponding to the prefix data in the order of the extraction by the extraction unit 12. In this manner, a prefix section determined to first overlap the inquiry section by the determination unit 13 is a prefix section overlapping the inquiry section, and serves as a prefix section closest to the target index key on the space-filling curve. The specification unit 14 may specify, as a search point, an index key indicating a minimum point or a maximum point in an overlap section in which the inquiry section overlaps the prefix section determined to first overlap the inquiry section by the determination unit 13. Thereby, it is possible to speed up a process of specifying the search point.

As described above, it is possible to sequentially extract pieces of prefix data in descending order of the length of a prefix by scanning a bit string of the target index key toward a high order from a low order. This is equivalent to an operation of gradually dividing an unsearched section from a narrow prefix section close to the target index key to a wide prefix section.

Hereinafter, the above-described exemplary embodiment will be described in more detail with reference to the following example. The present invention is not limited by the following example.

Example

In the present example, a space-filling curve obtained by generalizing a Z-curve is used.

Figure 4:
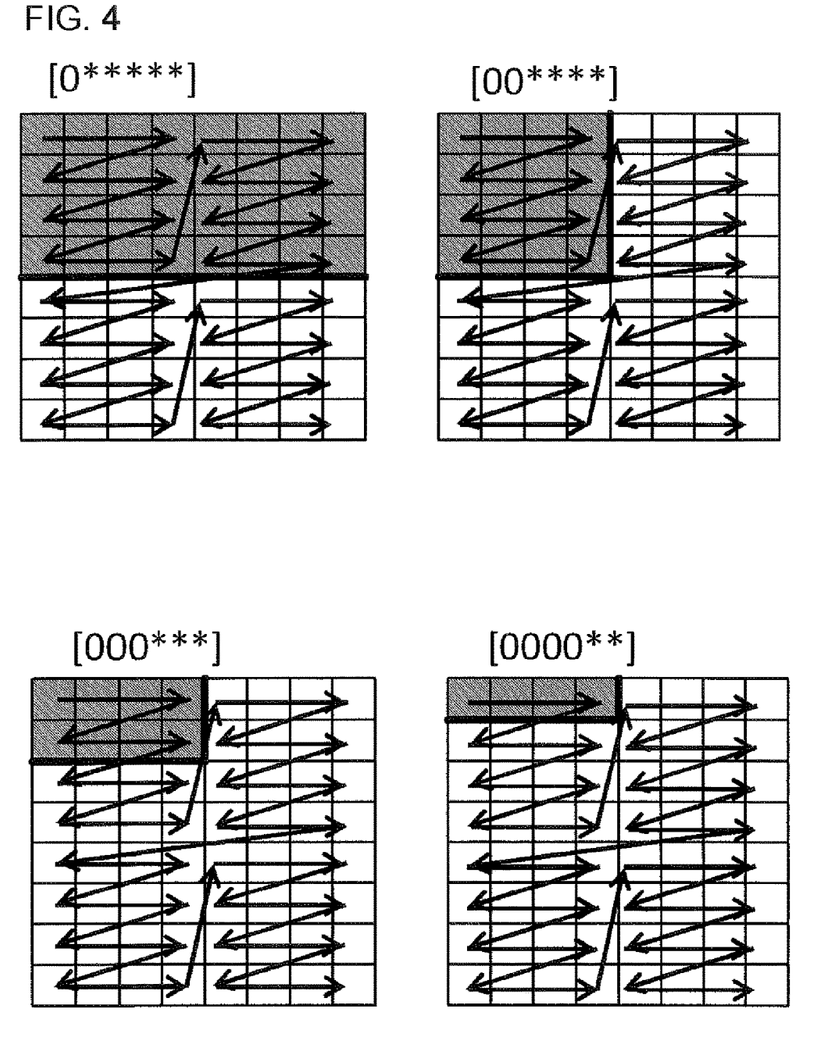
FIG. 4 is a diagram illustrating space-filling curves and prefix sections which are used in an example.

FIG. 4 is a diagram illustrating space-filling curves and prefix sections that are used in the example. In the present example, as illustrated in FIG. 4, a space-filling curve which is given the degree of freedom in the order of mixing bit strings for each attribute is used. A feasible example of this space-filling curve is a Z-curve. In the present example, a data set is mapped to a two-dimensional space, and the two-dimensional space is represented by the space-filling curve in a one-dimensional manner. Specifically, the space-filling curve mixes bit strings "x1, x2, x3" and "y1, y2, y3" of two attributes having a length of 3 bits like "y1, x1, y2, y3, x2, x3". Arrows illustrated in FIG. 4 represent a state where a two-dimensional space is filled up by a space-filling curve.

In addition, FIG. 4 illustrates four pieces of prefix data and prefix sections corresponding to the respective pieces of prefix data. In an upper left diagram, a prefix section corresponding to prefix data "0***" is indicated as a gray background (hatching). In an upper right diagram, a prefix section corresponding to prefix data "00" is indicated as a gray background (hatching). In a lower left diagram, a prefix section corresponding to prefix data "000*" is indicated as a gray background (hatching). In a lower right diagram, a prefix section corresponding to prefix data "0000**" is indicated as a gray background (hatching). In this manner, in the space-filling curve of the present example, prefix data and a prefix section indicated by the prefix data are associated with each other on a one-to-one basis. Further, it can be understood that the length of a prefix (the number of 0) of the prefix data and the size of the prefix section have a negative correlation. That is, the prefix section becomes smaller as the length of the prefix becomes longer, and the prefix section becomes larger as the length of the prefix becomes shorter.

In the present example, "*" is used as a wildcard character constituting prefix data. Thereby, a bit string in which "*" is replaced with 0 indicates a minimum value of a prefix section corresponding to the prefix data, and a bit string in which "*" is replaced with 1 indicates a maximum value of a prefix section corresponding to the prefix data. In the following description, an i-th bit from the most significant bit of a bit string P may be denoted by P[i].

A search apparatus 10 in the present example specifies a minimum point (search point) which is larger than an arbitrary point P on a space-filling curve (target index key) and is included in an inquiry section, as follows.

The search apparatus 10 in the present example scans a bit string P at a point P in a direction from the least significant side (n-1-th bit) to the most significant side (0-th bit) in order. When the search apparatus 10 refers to an i-th bit, the search apparatus performs nothing in a case where P[i] is 1, replaces P[i] with 1 in a case where P[i] is 0, and replaces each lower-order bit than i with "*". The search apparatus 10 sequentially extracts pieces of prefix data including at least one point, which is larger than the point P, in order of proximity to the point P on the space-filling curve on the basis of such a replacement rule.

The search apparatus 10 obtains a minimum point in an overlap section (intersecting section) where a prefix section P corresponding to the extracted prefix data and an inquiry section Q overlap each other. When the prefix section P and the inquiry section Q overlap each other, the search apparatus 10 specifies the minimum point of the overlap section as a search point. The search apparatus 10 can compare a bit string at a minimum point in the section P with a bit string at a minimum point in the section Q for each attribute (each dimension), and can obtain a minimum point in the overlap section from a larger bit string. The search apparatus 10 can determine the overlapping of both the sections by determining whether or not the minimum point in the overlap section is within the range of the section Q. When both the sections do not overlap each other, the search apparatus 10 proceeds to the processing of an i-1-th bit of a bit string P.

The replacement rule is a rule for extracting pieces of prefix data including at least one point which is larger than the point P in order of proximity to the point P on the space-filling curve. The search apparatus 10 may be a replacement rule opposite thereto, that is, a rule for extracting pieces of prefix data including at least one point which is smaller than the point P in order of proximity to the point P on the space-filling curve. According to the replacement rule, when the search apparatus 10 refers to an i-th bit, the search apparatus performs nothing in a case where P[i] is 0, replaces P[i] with 0 in a case where P[i] is 1, and replaces each lower-order bit than i with "*".

In this manner, the search apparatus 10 (extraction unit 12) in the present example may have the following replacement rule. That is, the search apparatus 10 (extraction unit 12) has at least one of a first replacement rule for changing a reference bit of a bit string of a target index key to 1 when the reference bit is 0 and changing a lower-order bit than the reference bit to a wildcard character, and a second replacement rule for changing a reference bit to 0 when the reference bit is 1 and changing a lower-order bit than the reference bit to a wildcard character. According to the first replacement rule, prefix data in a prefix section formed by a set of index keys larger than the target index key is extracted. According to the second replacement rule, prefix data in a prefix section formed by a set of index keys smaller than the target index key is extracted.

In addition, the replacement rule is a rule for bit scanning of every 1 bit, but can be set to be a rule for bit scanning of every k bits in order to improve the efficiency of a process by a computer. In this case, the replacement rule may be set to include at least one of bit inversion and replacement with a wildcard character, which are capable of obtaining the same results as the above-mentioned replacement rule, with respect to each of all bit patterns capable of being taken by k bits. For example, when bit scanning of every 2 bits is performed, a replacement rule is set with respect to each of all bit patterns "00", "01", "10", and "11" of a reference bit string. Specifically, when the reference bit string is "00", a pattern in which the reference bit string is replaced with "01" and each lower-order bit than the reference bit string is replaced with "*" and a pattern in which the reference bit string is replaced with "1*" and each lower-order bit than the reference bit string is replaced with "*" are executed. When the reference bit string is "01", a pattern in which the reference bit string is replaced with "1*" and each lower-order bit than the reference bit string is replaced with "*" is executed. When the reference bit string is "10", the reference bit string is replaced with "11" and each lower-order bit than the reference bit string is replaced with "*" is executed. When the reference bit string is "11", replacement is not performed.

Hereinafter, the present example will be described in more detail with reference to FIGS. 5 and 6.

Figure 5:
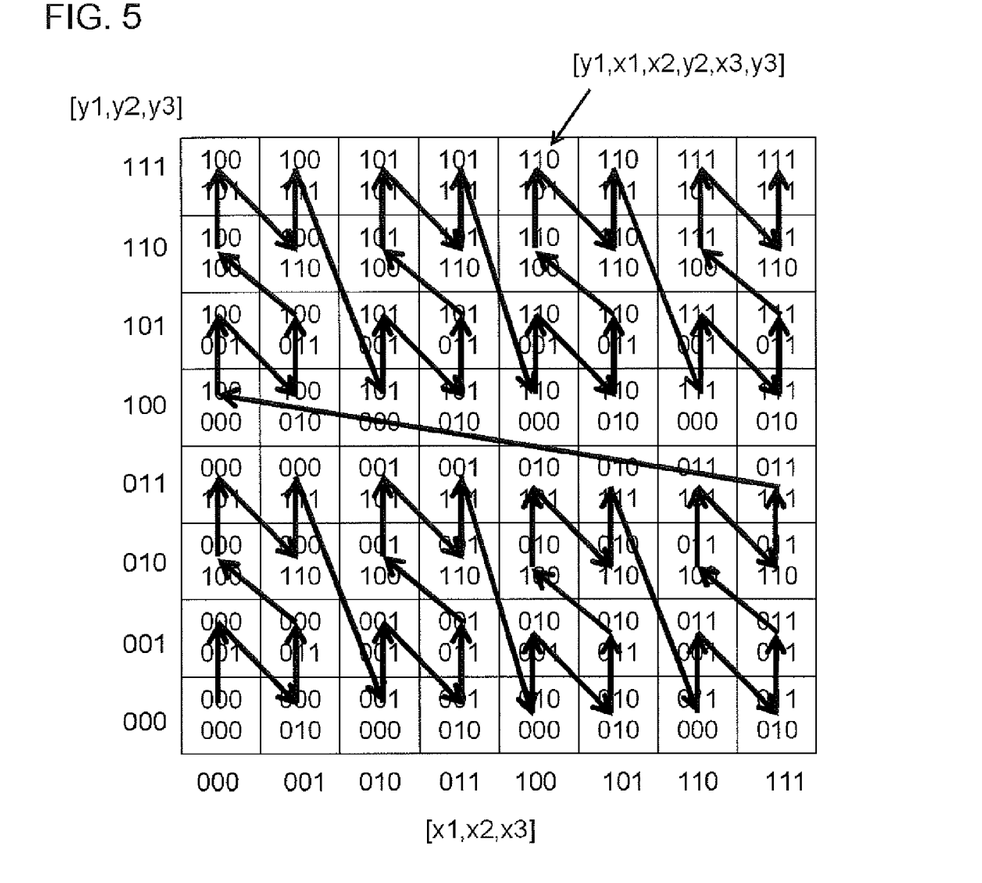
FIG. 5 is a diagram illustrating space-filling curves and prefix sections that are used in the present example.

FIG. 5 is a diagram illustrating space-filling curves and index keys which are used in the present example.

Figure 6:
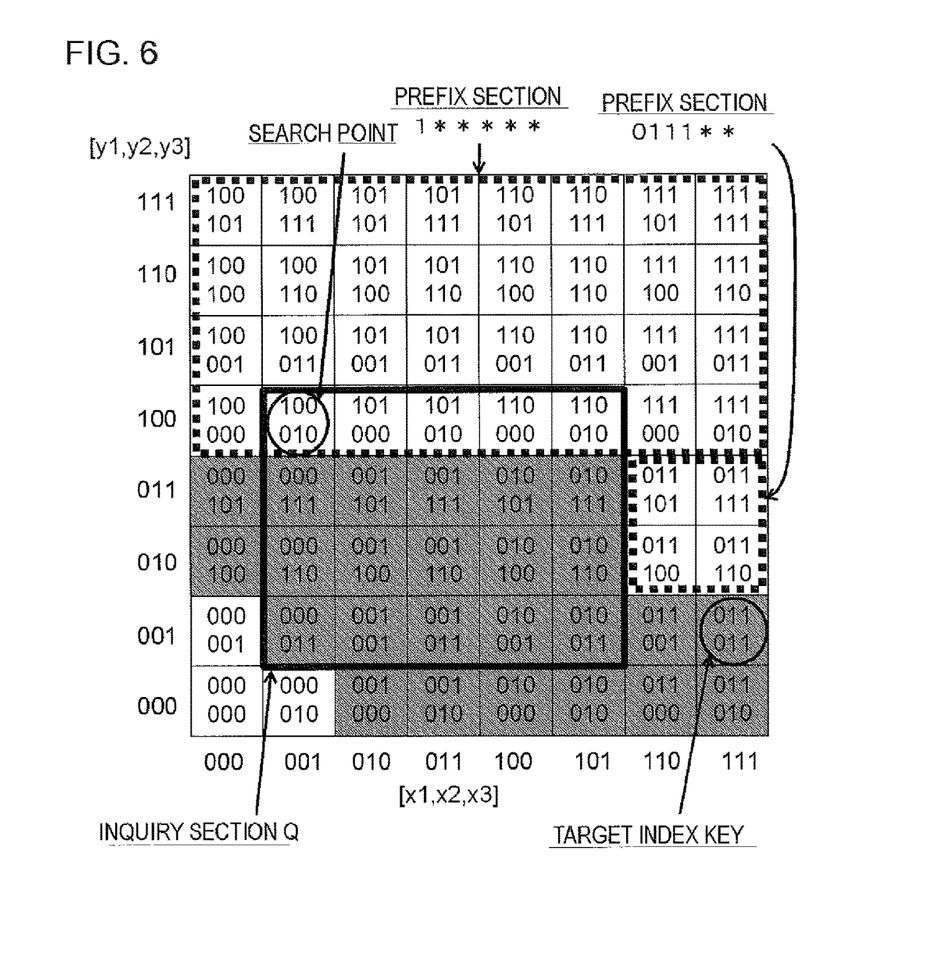
FIG. 6 is a schematic diagram illustrating the specification of a search point from a target index key in the present example.

FIG. 6 is a schematic diagram illustrating the specification of a search point from a target index key in the present example. In FIG. 6, an inquiry section Q, a searched section, an unsearched section, a target index key, and a search point are illustrated. The searched section is indicated as a gray background (hatching), and the unsearched section is indicated by a thick dashed line.

Herein, an example in which a maximum point in the searched section is set as a target index key is shown. That is, in this example, a section up to a point indicated by a target index key "011011" is searched for, and this point is denoted by P. In the present example, a minimum point "100010" in the unsearched section and the inquiry section Q is specified as a search point. A data page corresponding to an index key indicated by the search point serves as a hit page to be subsequently processed.

The search apparatus 10 acquires the target index key "011011" indicating the point P and scans a bit string of the point P toward a high order from a low order to thereby extract pieces of prefix data in order of proximity to the point P on a space-filling curve. The search apparatus 10 performs nothing on both the high-order 2 bits being 1, replaces the third low-order bit being 0 with 1, and replaces each lower-order bit than the third low-order bit with "*" on the basis of a replacement rule for performing scanning for each bit. Thereby, the search apparatus 10 extracts prefix data "0111**".

The search apparatus 10 determines the overlapping of the inquiry section Q and a prefix section indicated by prefix data "0111**". Since the prefix section does not overlap the inquiry section Q, the search apparatus 10 attempts to extract prefix data corresponding to the second closest prefix section. The search apparatus 10 sequentially refers to the fourth low-order bit and the fifth low-order bit of a bit string at the point P, performs nothing on both the bits being 1, and refers to the sixth low-order bit (most significant bit). The search apparatus 10 replaces the sixth low-order bit being 0 with 1, and replaces each lower-order bit than the sixth low-order bit with "*". Thereby, the search apparatus 10 extracts prefix data "1*****".

Since the inquiry section overlaps a prefix section indicated by prefix data "1*****", the search apparatus 10 specifies a minimum point in the overlap section in which both the sections overlap each other as a search point. At this time, the search apparatus 10 compares a bit string at a minimum point "100000" in a prefix section with a bit string at a minimum point "000011" in the inquiry section Q for each attribute. The minimum point "100000" in the prefix section is constituted by a bit string "000" of an attribute x and a bit string "100" of an attribute y. The minimum point "000011" in the inquiry section Q is constituted by a bit string "001" of an attribute x and a bit string "001" of an attribute y. The bit string "001" in the inquiry section is selected for the attribute x, and the bit string "100" in the prefix section is selected for the attribute y. The search apparatus 10 specifies a minimum point "100010" in an overlap section from the selected bit strings.

The search apparatus 10 extracts page information corresponding to index data including the specified search point "100010" from the index storage unit 16, and sets a section up to a termination point in a section covered by a data page specified using the page information as a searched section. The search apparatus 10 repeatedly performs such a process until the search of the entire inquiry section is completed.

Although the search is performed toward a maximum point from a minimum point in the inquiry section Q in the above-mentioned example, it may be performed in a reverse order. For example, in FIG. 6, a prefix section of prefix data "1*****" is searched for, and it is assumed that a minimum point in the searched section is "100000". In this example, the search apparatus 10 specifies a maximum point "010111" in an unsearched section and the inquiry section Q as a search point. In this example, the search apparatus 10 acquires a point P (target index key) "100000" and scans a bit string at the point toward a high order from a low order to thereby extract pieces of prefix data in order of proximity to the point P on a space-filling curve. The search apparatus 10 performs nothing on low-order 5 bits being 0, replaces the sixth low-order bit being 1 with 0, and replaces each lower-order bit than the sixth low-order bit with "*" on the basis of a replacement rule for performing scanning for each bit. Thereby, the search apparatus 10 extracts prefix data "0*****".

Since the inquiry section overlaps a prefix section indicated by prefix data "0*****", the search apparatus 10 specifies a maximum point in the overlap section in which both the sections overlap each other as a search point. At this time, the search apparatus 10 compares a bit string at a maximum point "011111" in a prefix section with a bit string at a minimum point "110010" in the inquiry section Q for each attribute. The maximum point "011111" in the prefix section is constituted by a bit string "111" of an attribute x and a bit string "011" of an attribute y. The maximum point "110010" in the inquiry section Q is constituted by a bit string "101" of an attribute x and a bit string "100" of an attribute y. The bit string "101" in the inquiry section is selected for the attribute x, and the bit string "011" in the prefix section is selected for the attribute y. The search apparatus 10 specifies a maximum point "010111" in an overlap section from the selected bit strings.

In the above-mentioned example, the replacement rule for performing scanning for each bit is used. However, even when a replacement rule for scanning a plurality of bits is used, it is possible to extract the same prefix data as that in the above-mentioned example.

In this manner, according to the present example, it is possible to efficiently detect a search point within an inquiry section of a query through a simple bit arithmetic operation for a bit string indicated by a boundary point in a searched section, and to detect a hit page at a high speed.

Note that, in the flow chart used in the descriptions above, a plurality of steps (processes) are described in order. However, the order of the plurality of steps performed in the present exemplary embodiment is not limited to the order of the steps described. In the present exemplary embodiment, the order of the steps illustrated in the drawing may be changed within a range in which the change does not impair the details of the steps.

The application is based on Japanese Patent Application No. 2013-146654 filed on Jul. 12, 2013, the content of which is incorporated herein by reference.

The invention claimed is:

1. A multidimensional-range search apparatus comprising:
   a memory storing instructions; and
   a processor configured to execute instructions to:
   acquire a target index key indicating an arbitrary point on a space-filling curve used to represent a multidimensional space, a data set being mapped to the multidimensional space in a one-dimensional manner, the data set being constituted by a plurality of attributes;
   extract prefix data capable of indicating a bit string of an index key included in an unsearched section on the space-filling curve, on the basis of a bit string of the acquired target index key;
   determine overlapping of an inquiry section of a multidimensional-range search and a prefix section on the space-filling curve, the prefix section being formed by a set of index keys having in common a prefix of the extracted prefix data;
   specify, as a search point, an index key indicating a minimum point or a maximum point in an overlap section in which the inquiry section overlaps the prefix section, the prefix section being closest to the target index key on the space-filling curve and being determined to overlap the inquiry section; and
   search an index storage unit for page information corresponding to the index key specified as the search point,
   wherein the space-filling curve has characteristics in which the prefix data and the prefix section are associated with each other on a one-to-one basis, the prefix section being formed by a set of index keys having in common a prefix of the prefix data in common, and in which a length of the prefix of the prefix data and a size of the prefix section have a negative correlation.

2. The multidimensional-range search apparatus according to claim 1, wherein the processor is further configured to execute instructions to sequentially extract the pieces of prefix data in order of proximity to the target index key on the space-filling curve by scanning the bit string of the target index key toward a high order from a low order.

3. The multidimensional-range search apparatus according to claim 1,
   wherein the space-filling curve represents the multidimensional space in a one-dimensional manner by mixing bit strings of respective attributes in any order without changing an arrangement order of the bit strings of the respective attributes, and
   wherein the processor is further configured to execute instructions to have a replacement rule including at least one of bit inversion and replacement with a wildcard character with respect to each bit pattern capable of being taken by a predetermined bit length, and extract the prefix data using the replacement rule corresponding to a bit pattern of partial bit strings obtained by partitioning the bit string of the target index key by the predetermined bit length, the predetermined bit length not depending on the number of attributes.

4. The multidimensional-range search apparatus according to claim 3, wherein the processor is further configured to execute instructions to have at least one of a first replacement rule for changing a reference bit of the bit string of the target index key to 1 when the reference bit is 0 and changing a lower-order bit than the reference bit to a wildcard character, and a second replacement rule for changing the reference bit to 0 when the reference bit is 1 and changing a lower-order bit than the reference bit to a wildcard character.

5. The multidimensional-range search apparatus according to claim 1, wherein the processor is further configured to execute instructions to perform: comparing a bit string of each attribute constituting an index key indicating a minimum point in the prefix section with a bit string of each attribute constituting an index key indicating a minimum point in the inquiry section for each attribute, and specifying an index key indicating a minimum point in the overlap section from a larger bit string of each attribute; or comparing a bit string of each attribute constituting an index key indicating a maximum point in the prefix section with a bit string of each attribute constituting an index key indicating a maximum point in the inquiry section for each attribute, and specifying an index key indicating a maximum point in the overlap section from a smaller bit string of each attribute.

6. A multidimensional-range search method comprising:
acquiring a target index key indicating an arbitrary point on a space-filling curve used to represent a multidimensional space, a data set being mapped to the multidimensional space in a one-dimensional manner, the data set being constituted by a plurality of attributes;
extracting prefix data capable of indicating a bit string of an index key included in an unsearched section on the space-filling curve, on the basis of a bit string of the target index key;
determining overlapping of an inquiry section of a multidimensional-range search and a prefix section on the space-filling curve, the prefix section being formed by a set of index keys having in common a prefix of the extracted prefix data;
specifying, as a search point, an index key indicating a minimum point or a maximum point in an overlap section in which the inquiry section overlaps the prefix section, the prefix section being closest to the target index key on the space-filling curve and being determined to overlap the inquiry section; and
searching an index storage unit for page information corresponding to the index key specified as the search point,
wherein the space-filling curve has characteristics in which the prefix data and the prefix section are associated with each other on a one-to-one basis, the prefix section being formed by a set of index keys having in common a prefix of the prefix data in common, and in which a length of the prefix of the prefix data and a size of the prefix section have a negative correlation.

7. The multidimensional-range search method according to claim 6, wherein in the extracting of the prefix data, the pieces of prefix data are sequentially extracted in order of proximity to the target index key on the space-filling curve by scanning the bit string of the target index key toward a high order from a low order.

8. The multidimensional-range search method according to claim 6,
wherein the space-filling curve represents the multidimensional space in a one-dimensional manner by mixing bit strings of respective attributes in any order without changing an arrangement order of the bit strings of the respective attributes, and
wherein in the extracting of the prefix data, the prefix data is extracted using a replacement rule corresponding to a bit pattern of partial bit strings obtained by partitioning the bit string of the target index key by a predetermined bit length in a plurality of replacement rules, including at least one of bit inversion and replacement with a wildcard character, which are provided with respect to respective bit patterns capable of being taken by the predetermined bit length, the predetermined bit length not depending on the number of attributes.

9. The multidimensional-range search method according to claim 8, wherein the plurality of replacement rules include at least one of a first replacement rule for changing a reference bit of the bit string of the target index key to 1 when the reference bit is 0 and changing a lower-order bit than the reference bit to a wildcard character, and a second replacement rule for changing the reference bit to 0 when the reference bit is 1 and changing a lower-order bit than the reference bit to a wildcard character.

10. The multidimensional-range search method according to claim 6, wherein in the specifying of the search point, performing: comparing a bit string of each attribute constituting an index key indicating a minimum point in the prefix section with a bit string of each attribute constituting an index key indicating a minimum point in the inquiry section for each attribute, and specifying an index key indicating a minimum point in the overlap section from a larger bit string of each attribute; or comparing a bit string of each attribute constituting an index key indicating a maximum point in the prefix section with a bit string of each attribute constituting an index key indicating a maximum point in the inquiry section for each attribute, and specifying an index key indicating a maximum point in the overlap section from a smaller bit string of each attribute.

11. A non-transitory computer-readable storage medium storing a program causing at least one computer to execute a multidimensional-range search method comprising:
acquiring a target index key indicating an arbitrary point on a space-filling curve used to represent a multidimensional space, a data set being mapped to the multidimensional space in a one-dimensional manner, the data set being constituted by a plurality of attributes;
extracting prefix data capable of indicating a bit string of an index key included in an unsearched section on the space-filling curve, on the basis of a bit string of the target index key;
determining overlapping of an inquiry section of a multidimensional-range search and a prefix section on the space-filling curve, the prefix section being formed by a set of index keys having in common a prefix of the extracted prefix data;
specifying, as a search point, an index key indicating a minimum point or a maximum point in an overlap section in which the inquiry section overlaps the prefix section, the prefix section being closest to the target index key on the space-filling curve and being determined to overlap the inquiry section; and
searching an index storage unit for page information corresponding to the index key specified as the search point,
wherein the space-filling curve has characteristics in which the prefix data and the prefix section are associated with each other on a one-to-one basis, the prefix section being formed by a set of index keys having in common a prefix of the prefix data in common, and in which a length of the prefix of the prefix data and a size of the prefix section have a negative correlation.

* * * * *